US008840496B2

(12) United States Patent
Yamanishi et al.

(10) Patent No.: US 8,840,496 B2
(45) Date of Patent: Sep. 23, 2014

(54) COOLING AIR INTAKE STRUCTURE FOR V-BELT DRIVE CONTINUOUSLY VARIABLE TRANSMISSION

(75) Inventors: Teruhide Yamanishi, Wako (JP); Hirokazu Komuro, Wako (JP); Ryuji Tsuchiya, Wako (JP); Nobutaka Horii, Wako (JP); Hideo Kashima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 299 days.

(21) Appl. No.: 13/393,016

(22) PCT Filed: Sep. 3, 2009

(86) PCT No.: PCT/JP2009/065404
§ 371 (c)(1),
(2), (4) Date: May 11, 2012

(87) PCT Pub. No.: WO2011/027445
PCT Pub. Date: Mar. 10, 2011

(65) Prior Publication Data
US 2012/0289370 A1    Nov. 15, 2012

(51) Int. Cl.
| F16D 1/00 | (2006.01) |
| F16H 57/04 | (2010.01) |
| B60K 11/00 | (2006.01) |
| B60K 11/08 | (2006.01) |
| F16H 57/035 | (2012.01) |
| B60K 17/08 | (2006.01) |
| F16H 57/02 | (2012.01) |

(52) U.S. Cl.
CPC .... *F16H 57/0489* (2013.01); *F16H 2057/0203* (2013.01); *F16H 57/0416* (2013.01); *B60Y 2200/126* (2013.01); *B60K 11/08* (2013.01); *F16H 57/035* (2013.01); *B60Y 2200/12* (2013.01); *F16H 2057/02065* (2013.01); *B60K 17/08* (2013.01)
USPC .............................. 474/144; 474/93; 180/68.1

(58) Field of Classification Search
USPC .......... 474/93, 150, 144, 146; 180/68.1, 68.2, 180/312, 346; 454/143
See application file for complete search history.

(56) References Cited

U.S. PATENT DOCUMENTS

| 2,189,294 A | * | 2/1940 | Pfleger ............................ 474/29 |
| 2,205,975 A | * | 6/1940 | Heyer ............................. 474/29 |

(Continued)

FOREIGN PATENT DOCUMENTS

| JP | 59-195018 U | 12/1984 |
| JP | 61-193890 | 12/1986 |

(Continued)

OTHER PUBLICATIONS

International Search Report corresponding to International Patent Application No. PCT/JP2009/065404 dated Dec. 1, 2009.

(Continued)

*Primary Examiner* — William E Dondero
*Assistant Examiner* — Minh Truong
(74) *Attorney, Agent, or Firm* — Squire Patton Boggs (US) LLP (57) ABSTRACT

Disclosed is a cooling air intake structure for a V-belt drive continuously variable transmission, which is disposed beside the rear wheel of a small vehicle and which does not permit muddy water and dust to enter therein. A cooling air inlet through which cooling air is taken in is formed at a position beside a transmission case and above a cooling fan side opening formed in the transmission case opposite to a drive pulley. A cooling air passage extending from the cooling air inlet to the side opening is formed so as to surround the side opening. Cooling air taken in through the cooling air inlet is guided so as to flow upward first and then flows downward along a U-shaped cooling air passage to the side opening of the transmission case beside the cooling fan.

9 Claims, 11 Drawing Sheets

(56) References Cited

U.S. PATENT DOCUMENTS

| | | | |
|---|---|---|---|
| 2,315,317 A * | 3/1943 | Copp et al. | 474/93 |
| 4,671,781 A * | 6/1987 | Tanaka et al. | 474/93 |
| 4,671,782 A | 6/1987 | Ochiai et al. | |
| 4,697,665 A * | 10/1987 | Eastman et al. | 180/230 |
| 6,267,700 B1 * | 7/2001 | Takayama | 474/93 |
| 6,544,134 B2 * | 4/2003 | Ohyama et al. | 474/144 |
| 6,557,438 B2 * | 5/2003 | Maeda et al. | 74/606 R |
| 6,808,465 B2 * | 10/2004 | Kuga et al. | 474/14 |
| 6,971,438 B2 * | 12/2005 | Oki et al. | 165/41 |
| 7,427,248 B2 * | 9/2008 | Chonan | 474/93 |
| 7,686,123 B2 * | 3/2010 | Ishida | 180/346 |
| 8,323,134 B2 * | 12/2012 | Tsukada et al. | 474/8 |
| 2002/0093423 A1 * | 7/2002 | Asumi et al. | 340/457 |
| 2005/0109554 A1 * | 5/2005 | Ishikawa et al. | 180/312 |
| 2007/0023220 A1 * | 2/2007 | Ishida et al. | 180/229 |
| 2007/0219030 A1 * | 9/2007 | Ho | 474/144 |
| 2008/0035089 A1 * | 2/2008 | Yamanishi et al. | 123/182.1 |
| 2008/0314676 A1 * | 12/2008 | Ishida | 180/366 |

FOREIGN PATENT DOCUMENTS

| | | |
|---|---|---|
| JP | 63-17695 Y2 | 5/1988 |
| JP | 06-272750 A | 9/1994 |
| JP | 2009019705 A | 1/2009 |
| JP | 2009-191969 A | 8/2009 |

OTHER PUBLICATIONS

Supplementary European Search Report application No. EP09848976 dated Feb. 13, 2013.

* cited by examiner

COOLING AIR INTAKE STRUCTURE FOR V-BELT DRIVE CONTINUOUSLY VARIABLE TRANSMISSION

TECHNICAL FIELD

In V-belt drive continuously variable transmissions for vehicles, frictional heat is generated by frictional contact between a V-belt and a drive pulley and between the V-belt and a driven pulley. The present invention relates to a cooling air intake structure for taking cooling air into the V-belt drive continuously variable transmission when those component parts need cooling.

BACKGROUND ART

A known air intake structure described in Patent Literature 1 has an air inlet opening toward the rear of the vehicle. This cooling air intake structure is effective in preventing muddy water and dust coming from the front from entering the cooling air intake structure, but is not necessarily effective in preventing muddy water and dust raised up by the rear wheel from entering the cooling air intake structure.

Patent Literature 1: JP Utility Model Publication S63-17695 (FIG. 5)

SUMMARY OF THE INVENTION

Technical Problem

It is an object of the present invention to provide a cooling air intake structure capable of avoiding taking in muddy water and dust coming from both the front and rear sides of a vehicle.

Solution to the Problem

The present invention has been made to solve the foregoing problem. According to the present invention, there is provided a cooling air intake structure for a V-belt drive continuously variable transmission disposed beside the rear wheel of a small vehicle, characterized in that a cooling air inlet through which cooling air is taken in is formed at a position beside a transmission case and above a cooling fan side opening formed in the transmission case opposite to a drive pulley; and a cooling air passage extending from the cooling air inlet to the side opening is formed in a manner surrounding the side opening.

In a preferred form of the present invention, the cooling air passage is formed in the shape of an inverted letter U such that cooling air taken in through the cooling air inlet formed at the position in an upper part of a space beside the transmission case flows upward first and then flows downward to the cooling fan side opening of the transmission case.

In a preferred form of the present invention, the cooling air inlet extends along an edge of a body cover.

In a preferred form of the present invention, the body cover is provided with pillion footrests, and the cooling air passage is formed in a space covered with the body cover extending below the pillion footrest.

In a preferred form of the present invention, an air cleaner is disposed above the transmission case such that an inlet of the air cleaner is above a cooling air duct forming the cooling air passage having the shape of an inverted letter U.

In a preferred form of the present invention, the cooling air passage is formed in the cooling air duct, and the cooling air duct covers the side opening formed in the transmission case and is attached to a flat part of the transmission case beside the drive pulley.

In a preferred form of the present invention, the cooling air duct is fastened to the transmission case with fastening members arranged on front and rear sides of the side opening formed in the transmission case.

In a preferred form of the present invention, at least a part of the cooling air inlet is positioned in an area which is beside the drive pulley of the V-belt drive continuously variable transmission and which has a diameter equal to that of the drive pulley.

In a preferred form of the present invention, cooling air flows in the cooling air duct along the U-shaped passage, and then flows rearward along an L-shaped passage to the cooling fan side opening.

In a preferred form of the present invention, a vibration isolating member is placed between the cooling air duct and the transmission case.

Effect of the Invention

According to the present invention, the cooling air inlet can be spaced a long distance apart from muddy water and dust flung up by the rear wheel. The cooling air duct can be formed in a small size. Therefore, entry of muddy water and dust into the cooling air inlet can be suppressed. Further, the cooling air intake structure has the advantage of preventing muddy water flowing along the upper surface of the transmission case from flowing into the transmission case.

Muddy water and dust can be separated from cooling air by the U-shaped cooling air passage. Therefore, if the cooling air intake structure is provided with a filter, the life of the filter can be extended.

Flow of foreign matters through the cooling air inlet can be easily prevented by the body cover.

The cooling air passage is formed in a space covered with a laterally protruding side skirt of the body cover below the pillion footrest. Therefore, cooling air can flow smoothly through the space inside the side skirt to the cooling air inlet.

Intake air can flow smoothly through the cooling air passage to the inlet of the air cleaner. Consequently, the performance of the internal combustion engine can be improved.

The cooling air duct is attached to the flat part beside the drive pulley. Therefore, intake noise generated by intake air flowing through the cooling fan side opening formed in the transmission case can be absorbed and noise suppressing effect can be improved.

The cooling air duct can firmly be attached to the transmission case with the fastening members arranged on the front and rear sides of the side opening.

Since the cooling air inlet can be spaced a long distance apart from dust flung up by the rear wheel without increasing the size of a front part of the V-belt drive continuously variable transmission, entrance of dust into the transmission can be suppressed.

Since a part of the cooling air passage continuous with the U-shaped part is bent in the L-shape, the efficiency of separating muddy water and dust from cooling air is improved and hence cleaning load on the filter can be reduced.

Leakage of cooling air through gaps is prevented and hence noise suppressing effect can further be improved.

REFERENCE SIGN LIST

11 . . . Air cleaner, 11a . . . Inlet of the air cleaner, 13 . . . Body cover, 18 . . . V-belt drive continuously variable transmission, 37 . . . Transmission case, 37L . . . Left half transmission case, 37R . . . Right half transmission case, 40 . . . Drive pulley, 50 . . . Cooling air duct, 50A . . . Inner duct member of the cooling air duct, 50B . . . Outer duct member of the cooling air duct, 51 . . . Cooling fan, 52 . . . Side opening formed in the transmission case opposite to a cooling fan, 56 . . . Flat part of the transmission case beside a drive pulley, 66 . . . Round O-ring (vibration isolating member) , 67 . . . Guide wall defining a cooling air passage, 68 . . . O-ring, 70 . . . Cooling air passage, 71 . . . Cooling air inlet, 74 . . . U-shaped part, 75 . . . L-shaped part, 76 . . . Fastening member, 77 . . . Space of a diameter equal to the diameter of the drive pulley 40, 78 . . . Edge of the body cover, 79 . . . Pillion footrest, 81 . . . Flow of cooling air, 82 . . . Flow of intake air in the air cleaner

DESCRIPTION OF THE EMBODIMENTS

Figure 1:
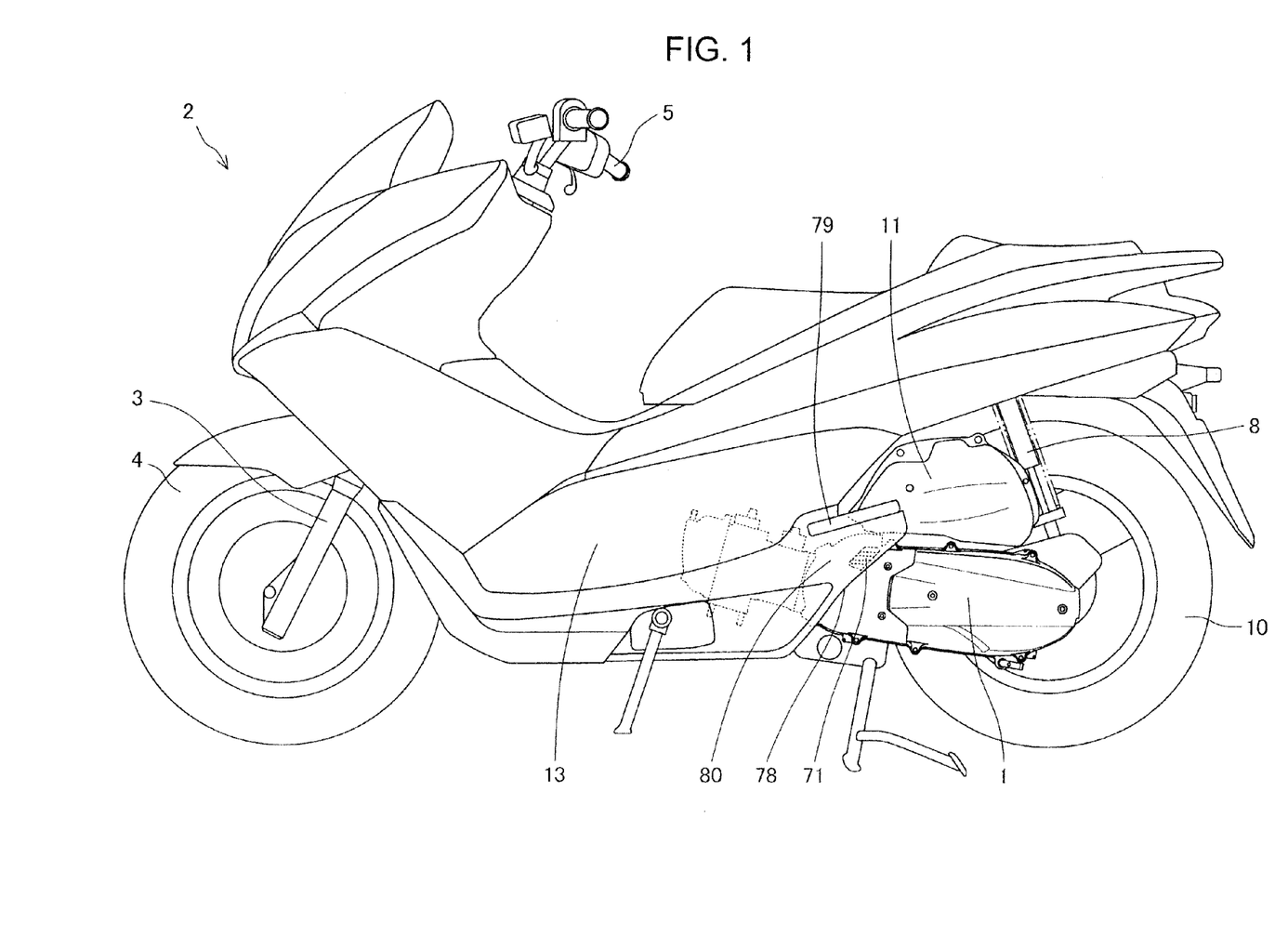
FIG. 1 is a side elevation of a motorcycle 2 relating to a preferred embodiment of the present invention.

FIG. 1 is a side elevation of a motorcycle 2 provided with a power unit 1 relating to a preferred embodiment of the present invention. The motorcycle 2 has a body frame formed by assembling a head pipe, a main frame extending obliquely downward toward the rear from the head pipe, right and left rear frames connected to the rear end of the main frame and extending obliquely upward toward the rear, and some frames. A front wheel 4 is rotatably supported on the lower end of a front fork 3 which is rotatably supported on the head pipe. A handlebar 5 is connected to an upper end part of the front fork 3.

The power unit 1 is suspended from the rear frame by connecting a hanger 6 (FIG. 2) formed integrally with a front part of the power unit 1 to a bracket fixed to the rear frame by a support shaft 7. A rear cushion 8 is extended between a bracket 14 (FIG. 2) formed on a rear end part of the power unit 1, and a bracket formed on a rear end part of the rear frame. Thus, the power unit 1 is suspended for swinging with the axis of its cylinder slightly inclined upward toward the front. A rear wheel 10 is mounted on a rear axle 9 (FIG. 3) extending to the right from a rear part of the power unit 1. The rear axle 9 is driven by the power unit 1.

An air cleaner 11 is disposed above the power unit 1. A body cover 13, made of a synthetic resin and consisting of a plurality of parts, is attached to the body frame so as to cover the power unit 1 and other component parts.

Figure 2:
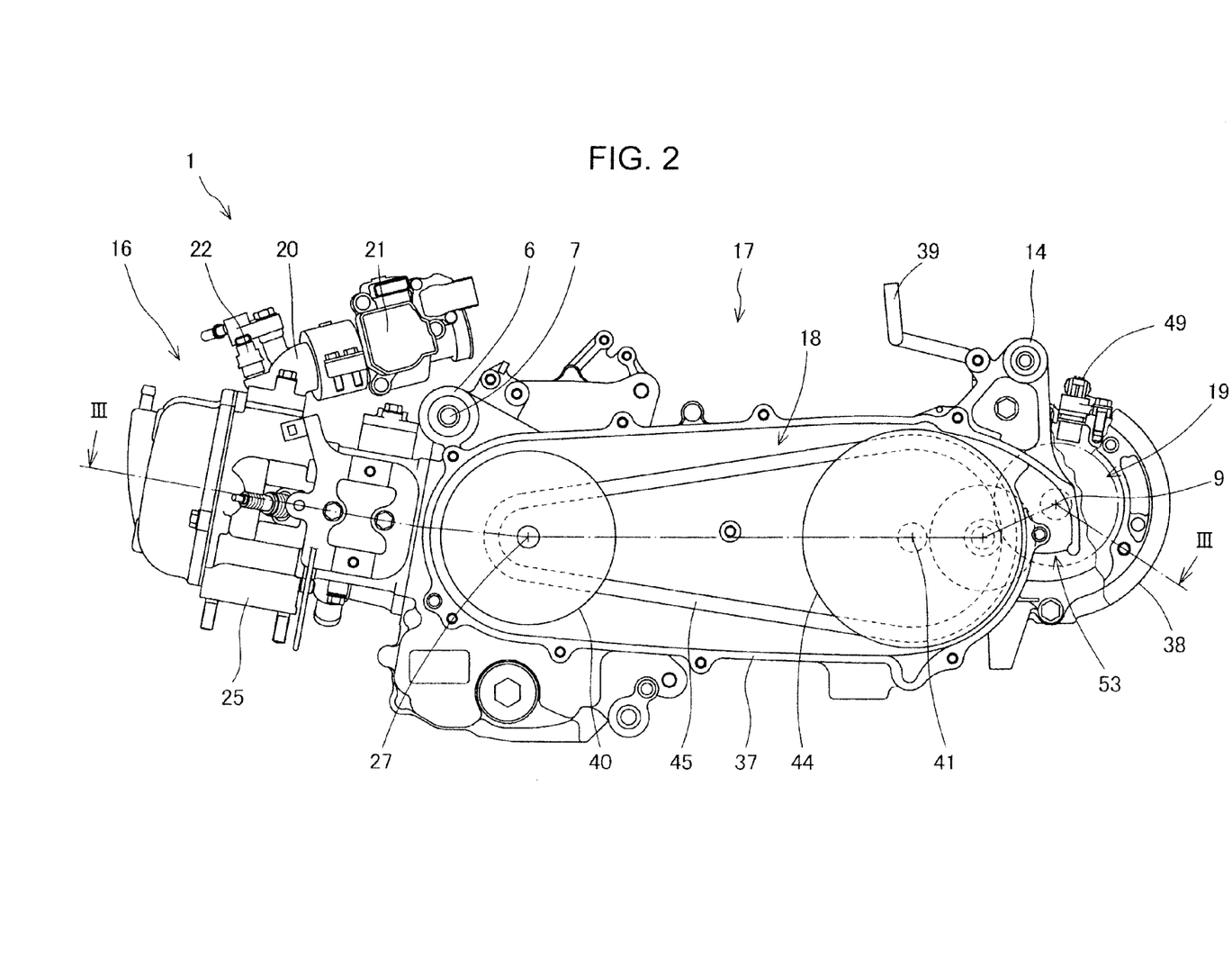
FIG. 2 is a side elevation, partly in section, of a power unit 1 as viewed from the left side.

FIG. 2 is a vertical sectional view of the power unit 1 as viewed from the left side. Terms modified by front, rear, right and left, are used for indicating positions, sides and parts on the front, rear, right and left sides, respectively, of the vehicle provided with the power unit. As shown in FIG. 2, the power unit 1 includes an internal combustion engine 16 and a transmission 17 extending toward the rear from the left side of the internal combustion engine 16. The transmission 17 includes a V-belt drive continuously variable transmission 18 and a reduction gear 19.

The engine 16 is a rocker arm type, water-cooled, four-stroke cycle, overhead valve, single-cylinder internal combustion engine. An intake pipe 20 has one end connected to an intake port formed in an upper part of a cylinder head 25 and the other end connected to a throttle body 21. The air cleaner 11 (FIG. 1) is connected to the inlet end of the throttle body 21. A fuel injection valve 22 is connected to the intake pipe 20. A gear case breather hose 39 is extended from an upper part of a gear case 38 and is connected to the intake chamber of the air cleaner 11. A speed sensor 49 is connected to an upper part of the gear case 38. The speed sensor 49 senses the tip speed of a gear 48 (FIG. 3) mounted on the rear axle 9 to determine a vehicle speed.

Figure 3:
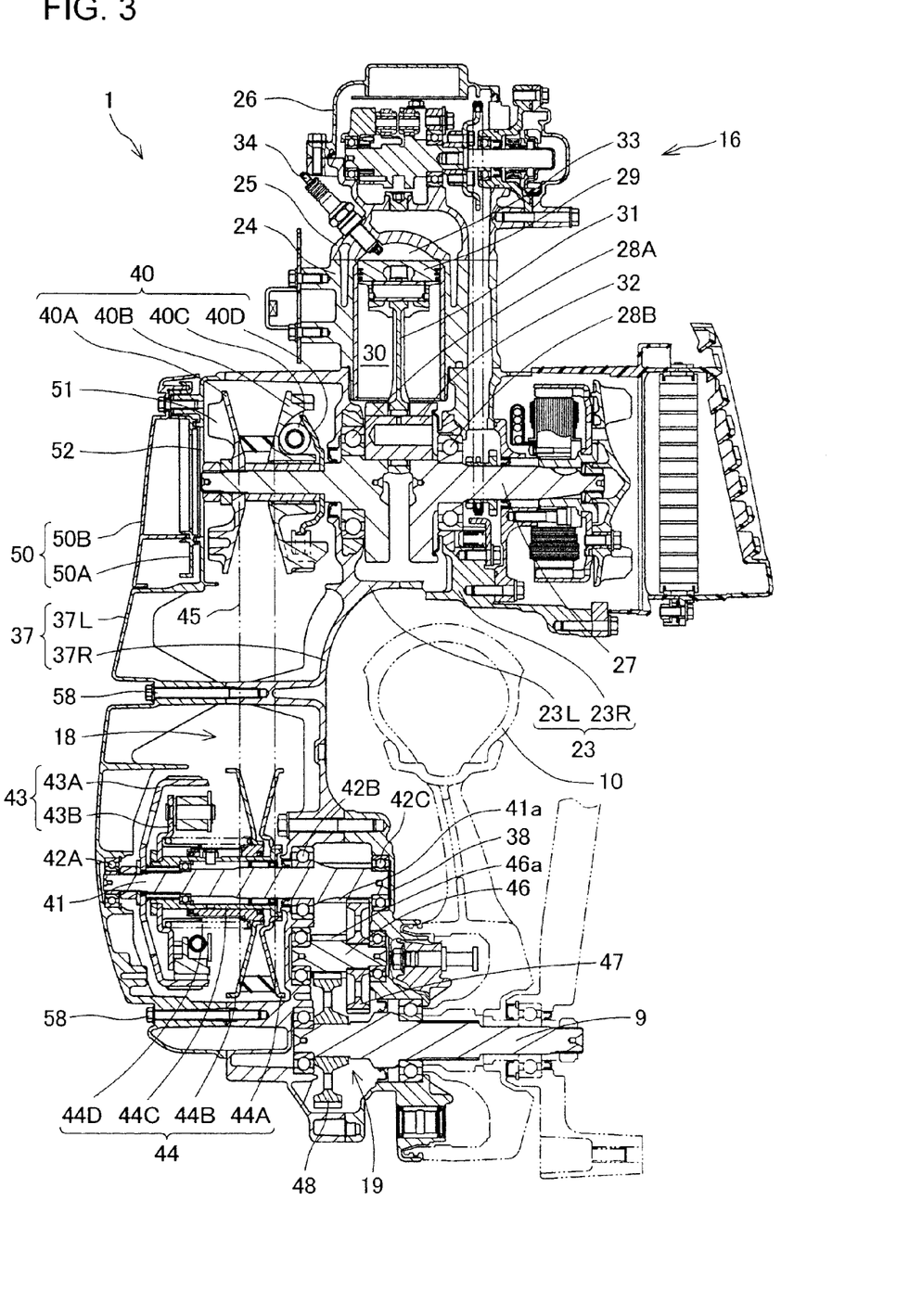
FIG. 3 is a sectional view taken on the line III-III in FIG. 2.

FIG. 3 shows a sectional view taken on the line III-III in FIG. 2. Referring to FIG. 3, the engine body of the internal combustion engine 16 is formed of a crankcase 23, a cylinder block 24 connected to the front end of the crankcase 23, a cylinder head 25 connected to the front end of the cylinder block 24, and a cylinder head cover 26 put on the cylinder head 25. The crankcase 23 is formed by joining together a left half crankcase 23L and a right half crankcase 23R.

A crankshaft 27 is supported for rotation in ball bearings 28A and 28B supported on the crankcase 23. A piston 29 is slidably fitted in a cylinder bore 30 formed in the cylinder block 24. The piston 29 is connected to the crankpin 32 of the crankshaft 27 by a connecting rod 31. The piston 29 reciprocates to drive the crankshaft 27 for rotation. A combustion chamber 33 is formed in the bottom surface of the cylinder head 25 opposite to the top surface of the piston 29. A spark plug 34 is attached to the cylinder head 25 such that the axis thereof is tilted to the left with respect to the center axis of the cylinder bore 30.

The transmission 17 is made up of the V-belt drive continuously variable transmission 18 and the reduction gear 19. The V-belt drive continuously variable transmission 18 is covered with a transmission case 37. The transmission case 37 has a right half transmission case 37R and a left half transmission case 37L. The right half transmission case 37R is fixedly connected to the left half crankcase 23L. The right half transmission case 37R and the left half transmission case 37L are fastened together with bolts. The reduction gear 19 is covered with a rear part of the right half transmission case 37R and the gear case 38. The gear case 38 is fastened to the right half transmission case 37R with bolts.

The crankshaft 27 serves as the drive shaft of the V-belt drive continuously variable transmission 18. A drive pulley 40 included in the V-belt drive continuously variable transmission 18 is mounted on a left part of the crankshaft 27. A driven shaft 41 is supported for rotation in bearings 42A, 42B and 42C supported on the left half transmission case 37L, the right half transmission case 37R and the gear case 38. A driven pulley 44 is interlocked with the driven shaft 41 by a centrifugal clutch 43 mounted on the driven shaft 41. An endless V-belt 45 is extended between the drive pulley 40 and the driven pulley 44.

The drive pulley 40 includes a fixed half part 40A, a movable half part 40B, weight rollers 40C and a ramp plate 40D. The driven pulley 44 includes a fixed half part 44A, a movable half part 44B, a rotating sleeve 44C and a coil spring 44D. The centrifugal clutch 43 includes an outer clutch member 43A and an inner clutch member 43B. The outer clutch member 43A is interlocked with the driven shaft 41. The inner clutch member 43B is connected to the rotating sleeve 44C.

As the rotational speed of the crankshaft 27 increases, the weight rollers 40C placed in a space between the movable half part 40B and the ramp plate 40D are moved radially outward by centrifugal force and the movable half part 40B is pushed by the weight rollers 40C toward the fixed half part 40A to increase the working pitch diameter of the drive pulley 40 and tensile stress induced in the V-belt 45 increases. Consequently, the movable half part 44B of the driven pulley 44 is moved against the resilience of the coil spring 44D, the distance between the fixed half part 44A and the movable half part 44B increases and the working pitch diameter of the driven pulley 44 is diminished. The rotational speed of the driven pulley 44 increases when the ratio of the working pitch diameter of the drive pulley 40 to that of the driven pulley 44 is thus increased. Upon the increase of the rotational speed of the driven pulley 44 beyond a predetermined rotational speed, the rotation of the driven pulley 44 is transmitted through the rotating sleeve 44C to the inner clutch member 43B of the centrifugal clutch 43, the centrifugal clutch 43 is engaged and the rotation of the driven pulley 44 is transmitted to the driven shaft 41.

The driven shaft 41 serves also as the input shaft of the reduction gear 19. A drive pinion 41a is formed integrally with the driven shaft 41. The rear axle 9 united with the rear wheel 10 is supported for rotation on the right half transmission case 37R and the gear case 38. An intermediate shaft 46 disposed between the driven shaft 41 and the rear axle 9 is supported for rotation on the right half transmission case 37R and the gear case 38. An intermediate gear 47 is fixedly mounted on the intermediate shaft 46 and is engaged with the drive pinion 41a. An intermediate pinion 46a is formed integrally with the intermediate shaft 46. A rear axle gear 48 is fixedly mounted on the rear axle 9 and is engaged with the intermediate pinion 46a. The torque of the driven shaft 41 is transmitted through the drive pinion 41a, the intermediate gear 47, the intermediate shaft 46, the intermediate pinion 46a and the rear axle gear 48 to the rear axle 9. The rotational speed of the rear axle 9 is far lower than that of the driven shaft 41 to drive the rear wheel 10 on the rear axle 9 at a reduced rotational speed.

Referring to FIG. 3, frictional heat is generated by frictional contact between the V-belt 45 and the drive pulley 44 and between the V-belt 45 and the driven pulley 44. The continuously variable transmission 18 is heated to high temperature by the frictional heat. A centrifugal cooling fan 51 is formed integrally with the fixed half part 40A of the drive pulley 40 on the left surface, namely, the back surface, of the fixed half part 40A. The cooling fan 51 sucks cooling air through the cooling air duct 50 and a side opening 52 formed in the left half transmission case 37L opposite to the cooling fan 51 to cool the continuously variable transmission 18. Air used for cooling the V-belt drive continuously variable transmission 18 is discharged to the outside through an outlet opening 53 (FIG. 2) formed in a rear part of the transmission case 37. The cooling air duct 50 is placed at a position corresponding to a front part of the left half transmission case 37L. The cooling air duct 50 has an inner duct member 50A and an outer duct member 50B.

Figure 4:
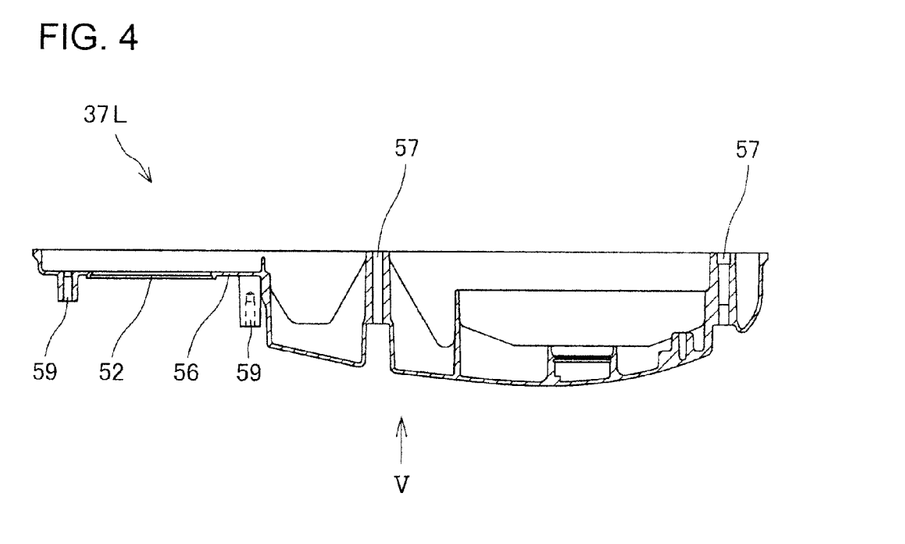
FIG. 4 is a sectional view of a left half transmission case 37L of a transmission case taken in a horizontal plane.
Figure 5:
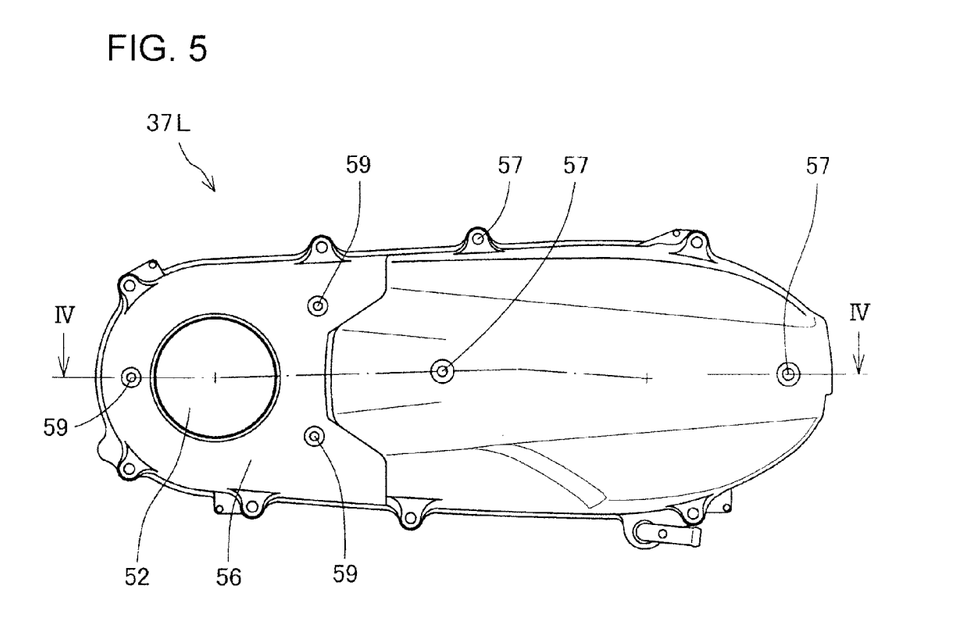
FIG. 5 is a side elevation of the left half transmission case 37L of the transmission case as viewed from the left side.

FIG. 4 shows a sectional view of the left half transmission case 37L taken in a horizontal plane and FIG. 5 shows a side elevation of the left half transmission case 37L taken from the left side in the direction of the arrow V in FIG. 4. A front part of the left half transmission case 37L corresponding to the drive pulley 40 has a flat part 56. The cooling air duct 50 is attached to the flat part 56. The side opening 52, namely, a cooling air inlet, is formed in a central part of the flat part 56. Bolt holes 57 for bolts for fastening together the right half transmission case 37R and the left half transmission case 37L are formed in a peripheral part and a middle part of the left half transmission case 37L. As shown in FIG. 3, bolts 58 are passed through the bolt holes 57 in the middle part and a rear part to fasten the left half transmission case 37L to the right half transmission case 37R. Three internally threaded holes 59 are formed in a front part of the left half transmission case 37L for bolts for fastening the cooling air duct 50 to the left half transmission case 37L.

Figure 6:
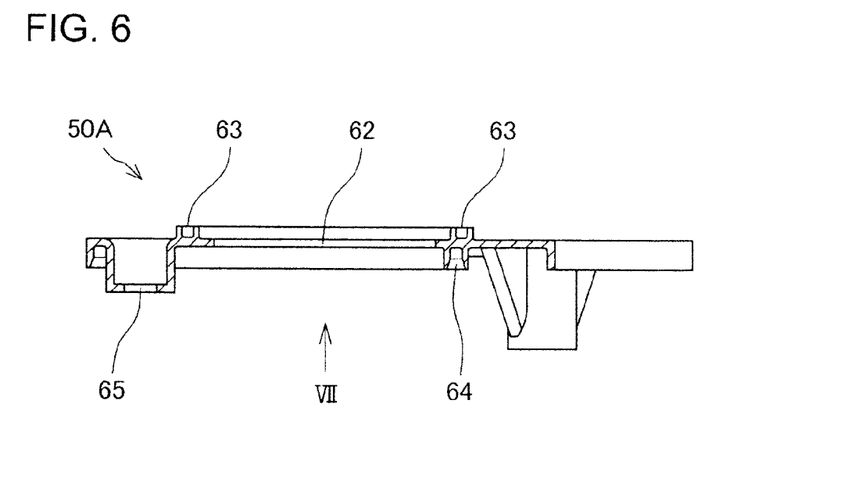
FIG. 6 is a sectional view of an inner duct member 50A of a cooling air duct taken in a horizontal plane.
Figure 7:
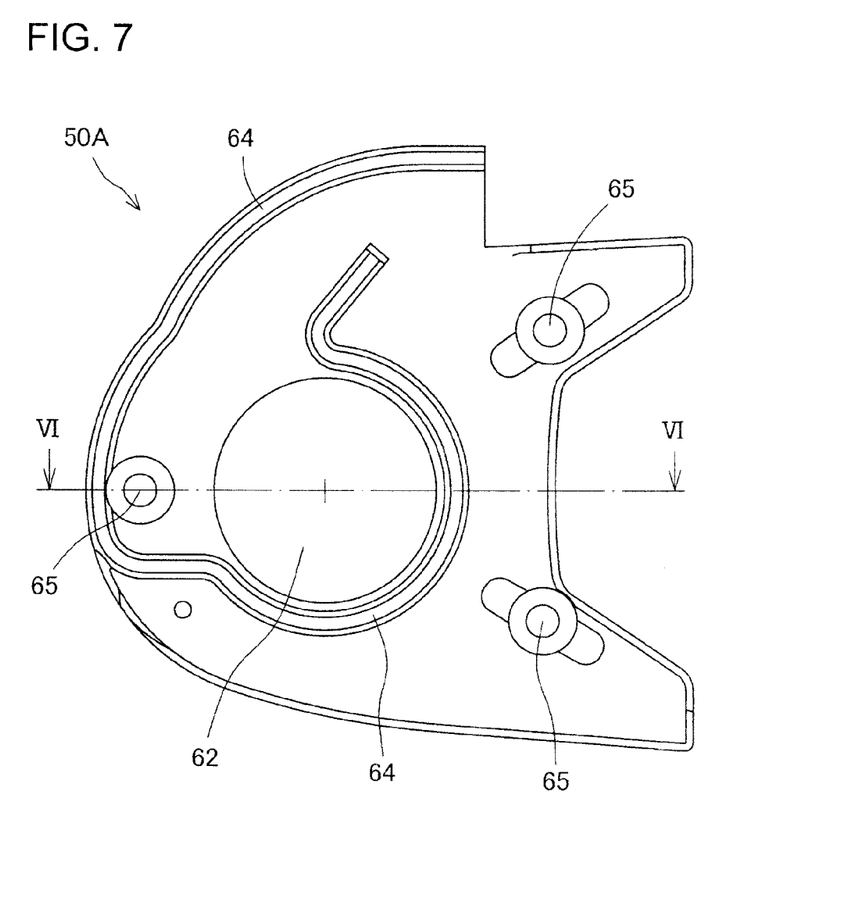
FIG. 7 is a side elevation of the inner duct member 50A of the cooling air duct as viewed from the left side.

FIG. 6 shows an enlarged sectional view of the inner duct member 50A of the cooling air duct 50 taken in a horizontal plane and FIG. 7 shows a side elevation of the inner duct member 50A of the cooling air duct 50 as viewed from the left side in the direction of the arrow VII. FIG. 6 is a sectional view taken on the line VI-VI in FIG. 7. A cooling air outlet 62 is formed in a central part of the inner duct member 50A of the cooling air duct 50, which is opposite to the side opening 52 of the left half transmission case 37L. A circular sealing groove 63 is formed in the inner surface of the inner duct member 50A facing the left half transmission case 37L, so as to correspond to a part of the left half transmission case 37L surrounding the side opening 52 opposite the cooling fan. An O-ring is fitted in the circular sealing groove 63. A sealing groove 64 is formed in the left surface, namely, the outer surface, of the inner duct member 50A so as to extend along a part of the peripheral part and around a central part of the left surface. An edge part of the guide wall 67 of the outer duct member 50B of the cooling air duct 50 is fitted in the sealing groove 64. The inner duct member 50A is provided with three bolt holes 65 for bolts for fastening the cooling air duct 50.

Figure 8:
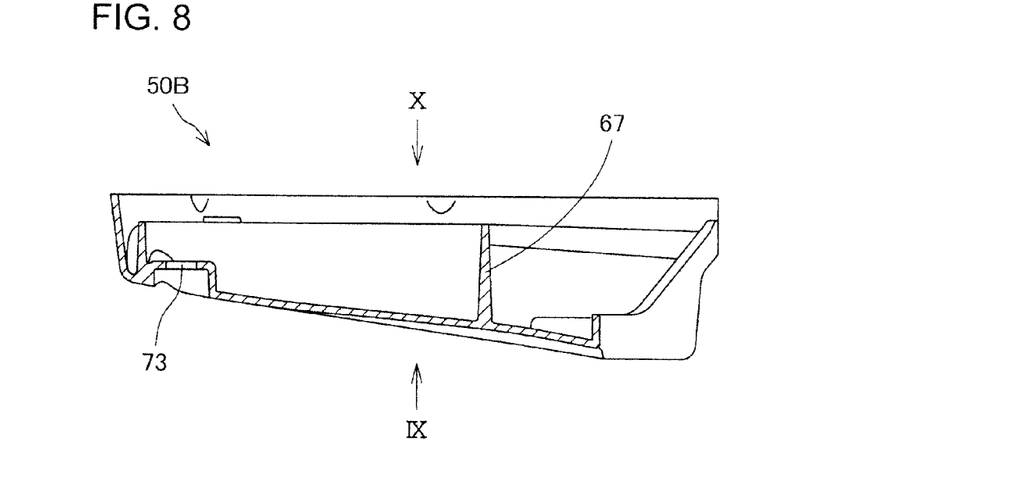
FIG. 8 is a sectional view of an outer duct member 50B of the cooling air duct taken in a horizontal plane.
Figure 9:
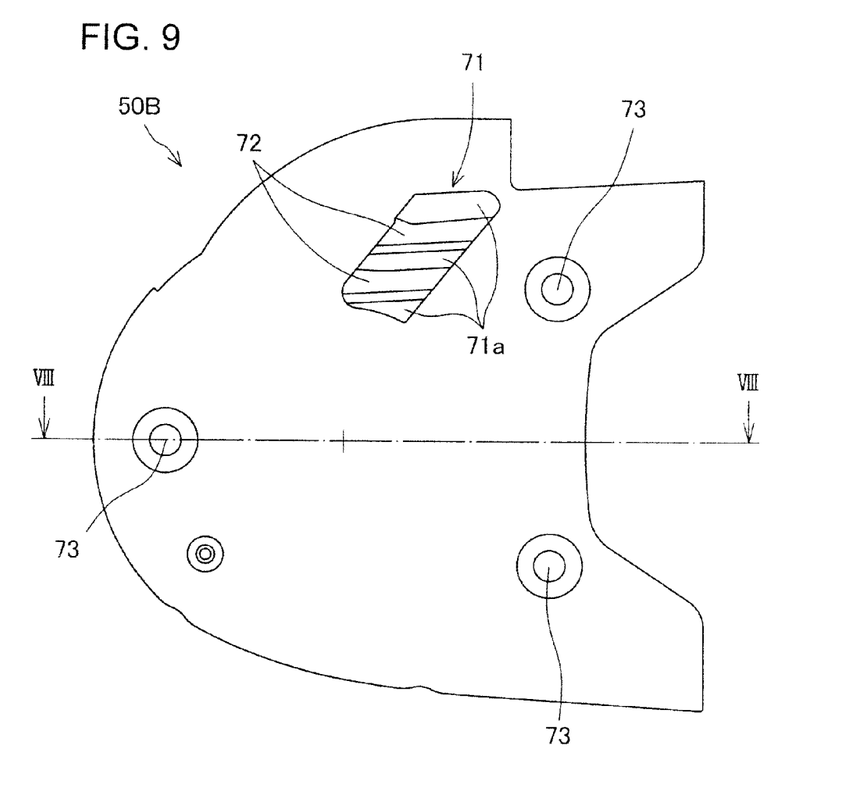
FIG. 9 is a side elevation of the outer duct member 50B of the cooling air duct as viewed from the left side, showing the outer surface of the outer duct member.
Figure 10:
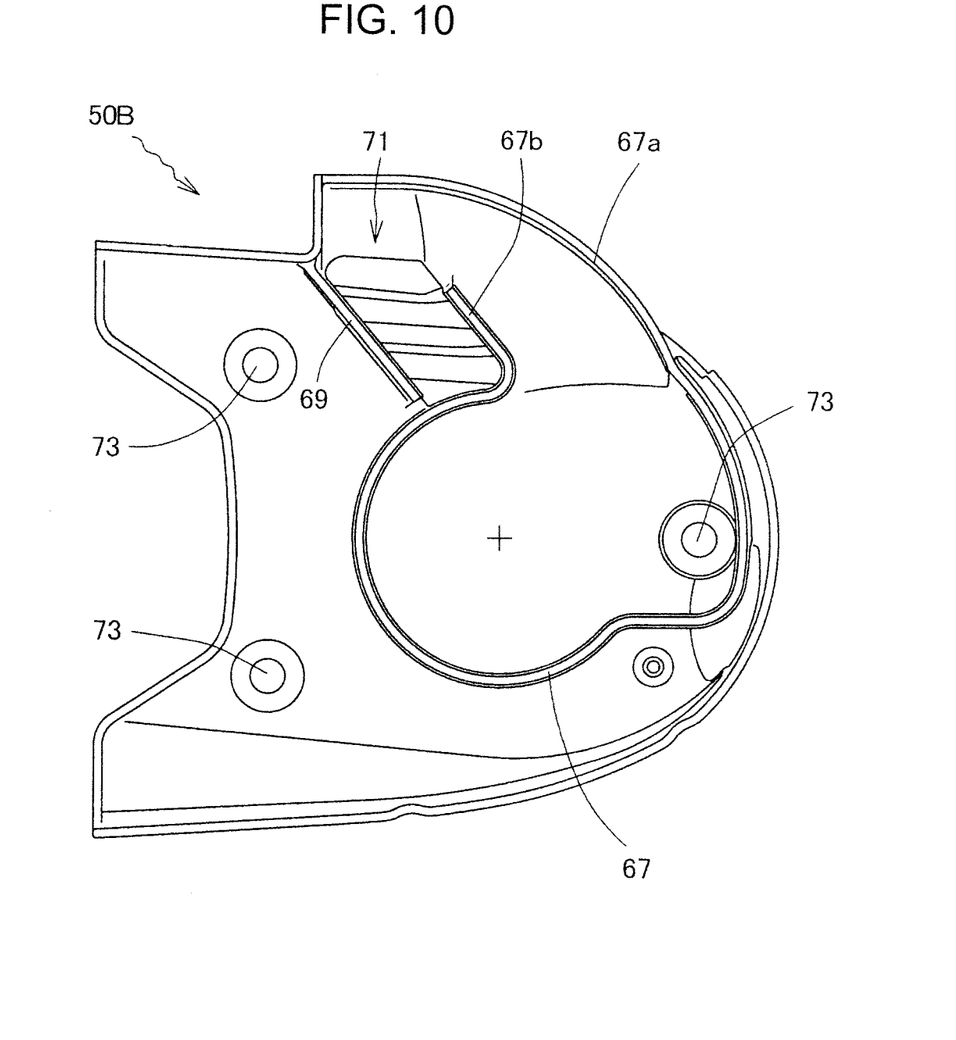
FIG. 10 is a side elevation of the outer duct member 50B of the cooling air duct as viewed from the right side, showing the inner surface of the outer duct member.
Figure 11:
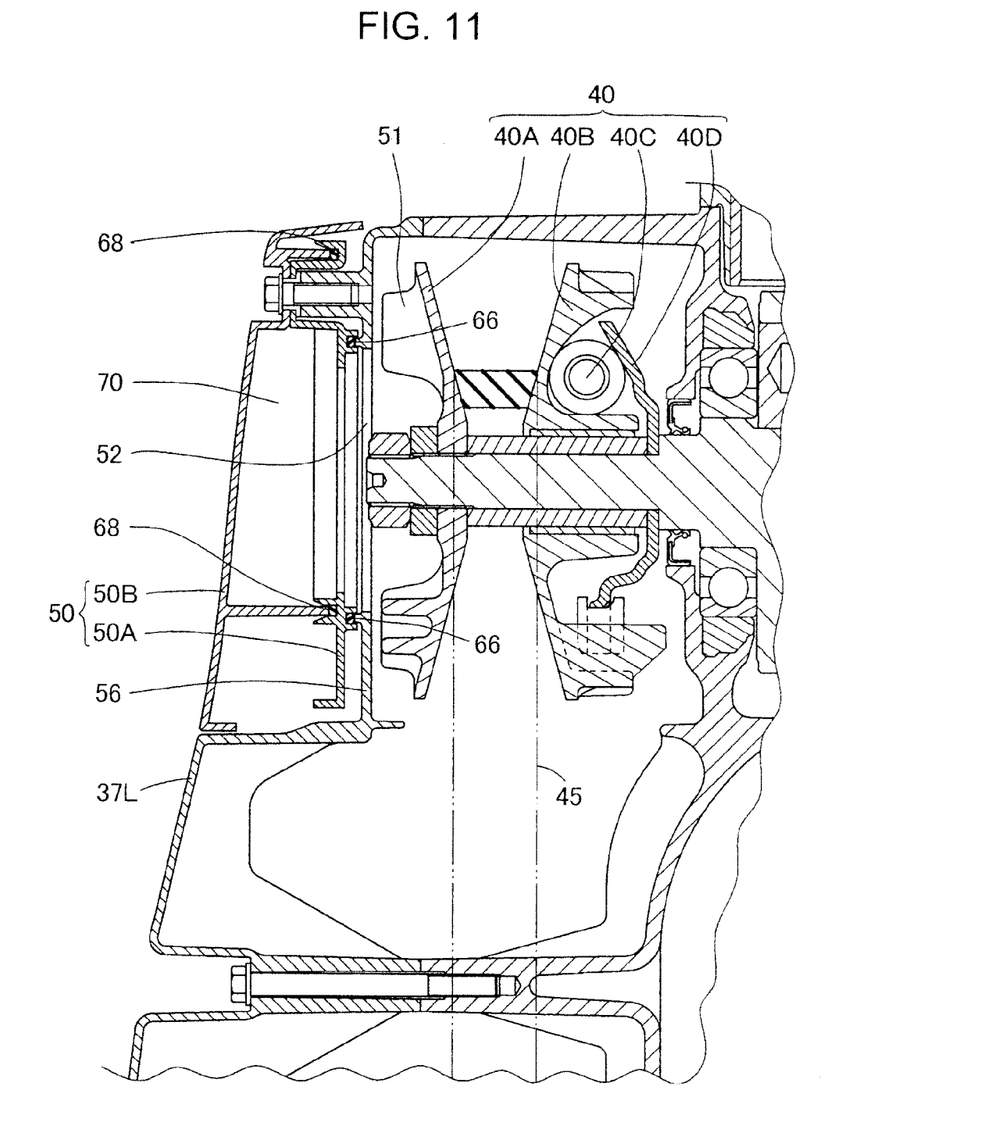
FIG. 11 is a sectional view of the assembly of the left half transmission case 37L and the cooling air duct 50 taken in a horizontal plane.

FIG. 8 shows an enlarged sectional view of the outer duct member 50B of the cooling air duct 50 taken in a horizontal plane, FIG. 9 shows a side elevation of the outer duct member 50B as viewed from the left side in the direction of the arrow IX in FIG. 8, showing the outer surface of the outer duct member 50B, and FIG. 10 is a side elevation of the outer duct member 50B as viewed from the right side in the direction of the arrow X in FIG. 8, showing the right surface, namely, the inner surface, of the outer duct member 50B. FIG. 8 is a sectional view taken on the line VIII-VIII in FIG. 9. As shown in FIG. 8, the outer duct member 50B is provided on its inner surface with the guide wall 67. The edge part of the guide wall 67 is fitted in the sealing groove 64 of the inner duct ember 50A provided with an O-ring 68 (FIG. 11). The O-ring 68 seals the joint of the edge part of the guide wall 67 and the surface of the sealing groove 64 to prevent air leakage.

As shown in FIG. 9, a cooling air inlet 71 provided with guide fins 72 is formed in an upper part of the outer duct member 50B. The guide fins 72 define cooling air inlet openings 71a. The outer duct member 50B is provided with three bolt holes 73 for bolts for fastening the cooling air duct 50.

As shown in FIG. 10, the guide wall 67 is erected integrally with the outer duct member 50B. The guide wall 67 is formed along a part of the periphery, and around a central part, of the outer duct member 50B. Cooling air taken in through the cooling air inlet 71 flows through a passage formed between a first front portion 67a of the guide wall 67 in a front part of the cooling air duct 50 and a second front portion 67b on the front side of the cooling air inlet 71 to the cooling air outlet 62 (FIG. 7). The edge part of the guide wall 67 including the portions 67a and 67b is fitted in the sealing groove 64 shown in FIG. 7. A guide wall 69 is formed behind the cooling air inlet 71. The guide wall 69 and the second front portion 67b of the guide wall 67 guide cooling air taken in through the cooling air inlet 71. As shown in FIG. 7, any sealing groove for receiving the guide wall 69 is not formed. Therefore, a small gap is formed between the edge of the guide wall 69 and the inner surface of the inner duct member 50A of the cooling air duct 50. Rain water leaking in through the cooling air inlet 71 is drained downward through the gap.

FIG. 11 shows a sectional view, taken in a horizontal plane, of the assembly of the left half transmission case 37L of the transmission case and the cooling air duct 50 including the inner duct member 50A and the outer duct member 50B. The cooling air duct 50 covers the side opening 52 of the transmission case 37 beside the cooling fan 51, is attached to the flat part 56 of the transmission case 37 opposite the drive pulley 40. The cooling air duct 50 defines a cooling air passage 70. The cooling air duct 50 is attached to the flat part 56 beside the drive pulley 40. Therefore, intake noise generated by intake air flowing through the side opening 52 formed in the transmission case 37 opposite to the cooling fan can be absorbed and noise suppressing effect can be improved. An O-ring 66 is placed in the joint of the left half transmission case 37L and the inner duct member 50A and the O-ring 68 is placed in the joint of the inner duct member 50A and the outer duct member 50B to seal the joints. Noise leakage can be prevented by the sealing effect of the O-rings 66 and 68.

Figure 12:
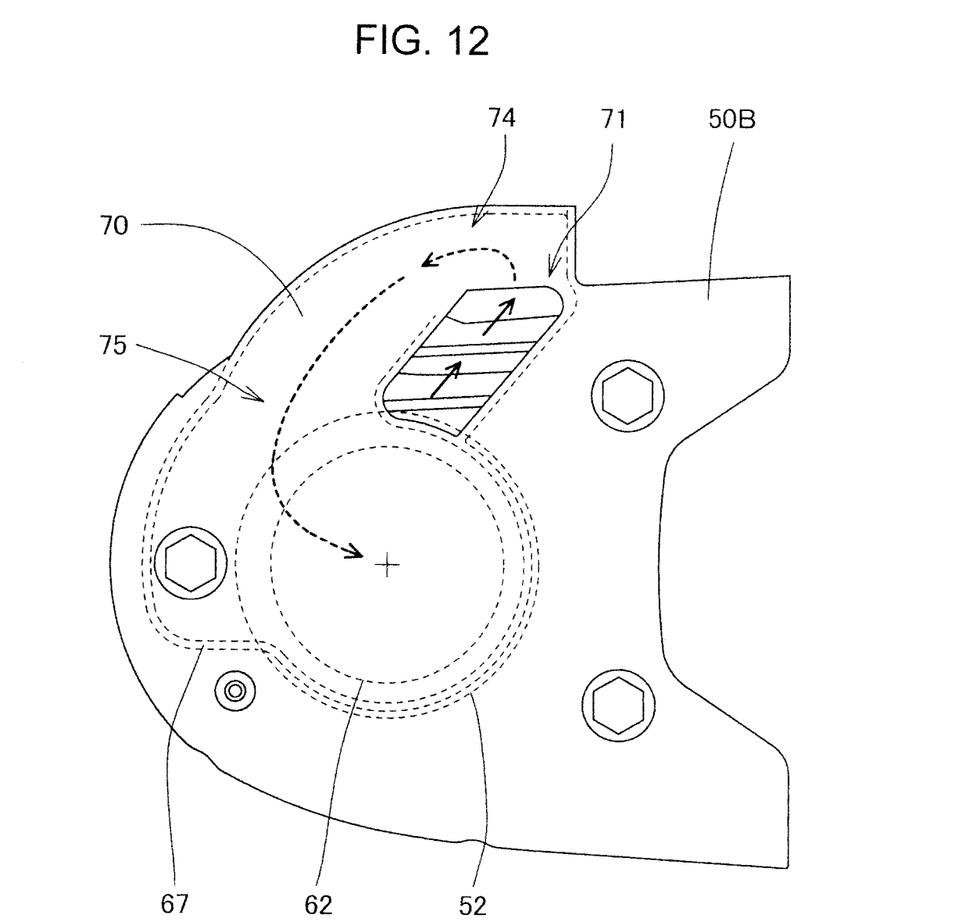
FIG. 12 is a perspective view of a cooling air passage 70 defined by the cooling air duct 50.

FIG. 12 is a perspective view of the cooling air passage 70 defined by the cooling air duct 50. Cooling air flows through the cooling air inlet 71 opening into an upper part of a space beside the drive pulley 40 into the cooling air duct 50, and then flows upward along the arrow indicated by a broken line. The flow of cooling air is inverted by a U-shaped part 74 and cooling air flows downward. Then, cooling air flows along an L-shaped part 75 toward a central part of the cooling air duct 50 and flows through the cooling air outlet 62 (FIG. 7) of the inner duct member 50A and the side opening 50 (FIG. 5) of the left half transmission case 37L beside the cooling fan 51 into the transmission case 37.

Muddy water and dust can be separated from cooling air by inverting the flow of cooling air by the U-shaped part 74. Therefore, if a filter is used, the life of the filter can be extended. The L-shaped part 75 connected to the U-shaped part 74 can enhance the efficiency of separating muddy water and dust from cooling air and reduce cleaning load on the filter.

Figure 13:
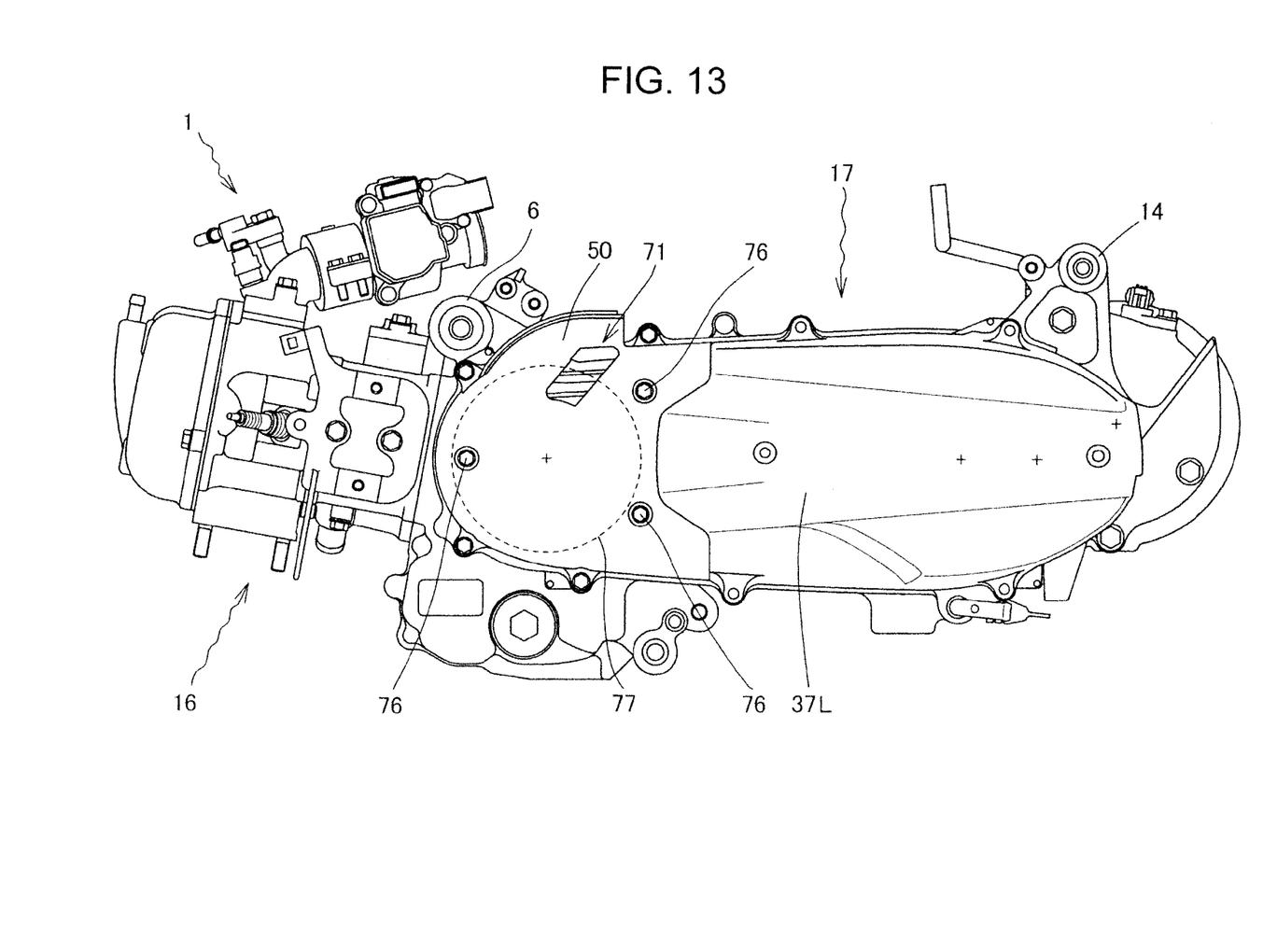
FIG. 13 is a side elevation of a transmission 17 in a state where a cooling air duct 50 is attached to the left half transmission case 37L, taken from the left side.

FIG. 13 is a side elevation, taken from the left side, of the power unit 1 in a state where the cooling air duct 50 is attached to the left half transmission case 37L. The cooling air duct 50 is fastened to the transmission case 37 with three fastening members 76 arranged around the side opening 52 beside the cooling fan 51. Therefore, the cooling air duct 50 can be firmly attached to the transmission case 37 with the three fastening members 76 arranged at three positions around the side opening 52 beside the cooling fan.

At least part of the cooling air inlet extends in an area 77 extending beside the drive pulley 40 of the V-belt drive continuously variable transmission 18 and having a diameter equal to that of the drive pulley 40. Since the cooling air inlet can be spaced apart from dust flung up by the rear wheel 10 without increasing the size of a front part of the V-belt drive continuously variable transmission 18, flow of dust into the transmission can be suppressed.

Figure 14:
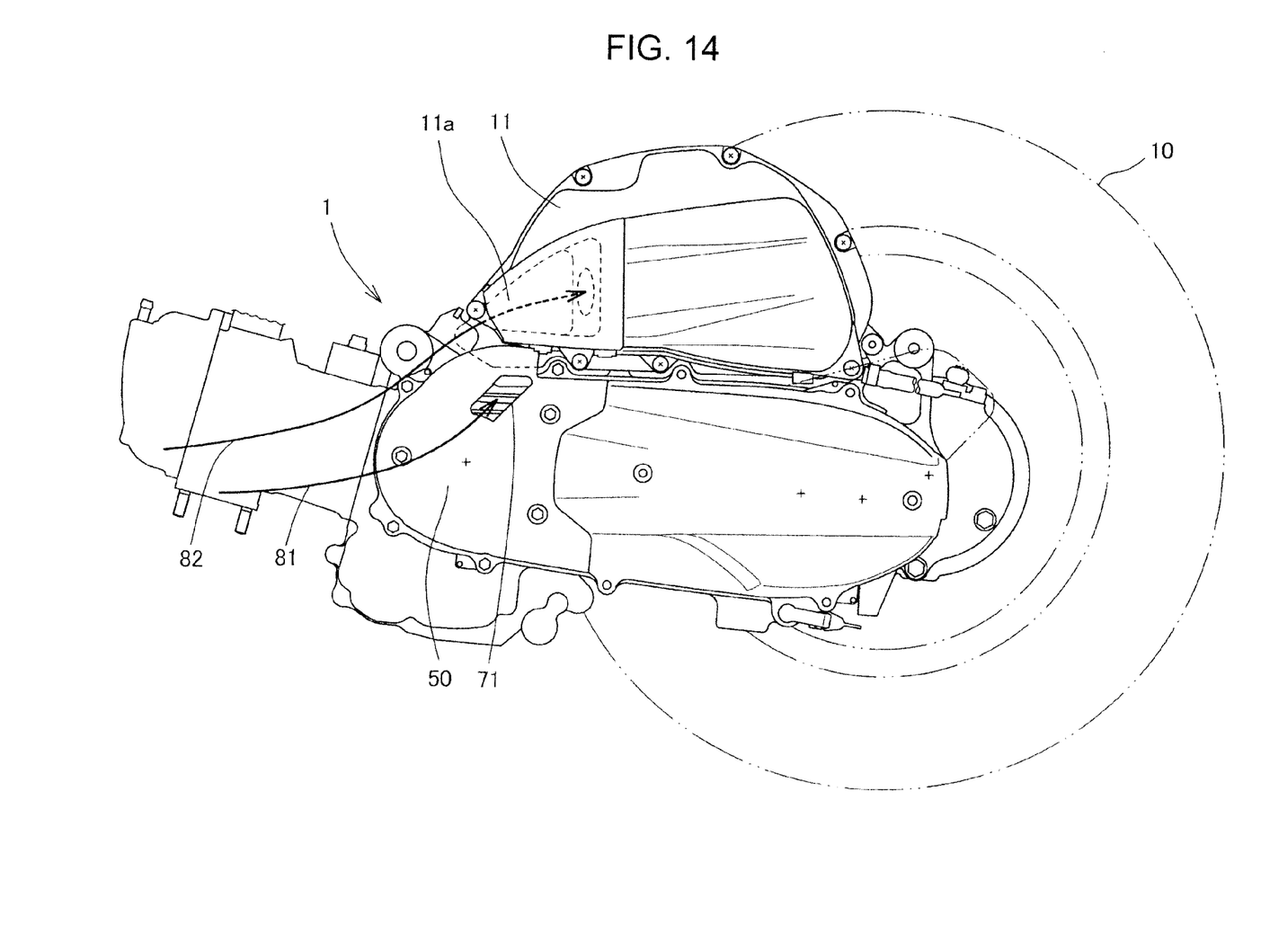
FIG. 14 is a side elevation of the power unit 1 and component parts disposed around the power unit, taken from the left side.

FIG. 14 shows a side elevation of the power unit 1 and component parts disposed around the power unit 1, taken from the left side. The cooling air inlet 71 extends along and behind the edge 78 (FIG. 1) of the body cover. Therefore, entrance of foreign matters into the cooling air inlet 71 can be easily prevented. The body cover 13 is provided with pillion footrests 79 (FIG. 1). The cooling air duct 50 is disposed in a space covered with a laterally protruding side skirt 80 below the pillion footrest 79. Therefore, cooling air can flow smoothly as indicated by the arrow 81 in FIG. 14 through the space covered with the laterally protruding skirt 80 and hence cooling efficiency can be improved. Since the cooling air inlet 71 is disposed in an upper part of a space extending beside the drive pulley 40, the cooling air inlet 71 is separated by a long distance from muddy water and dust flung up by the rear wheel 10 and hence entrance of muddy water and dust through the cooling air inlet 71 can be suppressed and the component parts of the cooling air duct are small. It is advantageous that muddy water that flows along the upper surface of the transmission case 37 holding the V-belt drive continuously variable transmission 18 does not flow into the transmission case 37.

The air cleaner 11 is disposed above the transmission case 37 such that the inlet 11a of the air cleaner 11 is positioned above an upwardly protruding part of the cooling air duct 50 in which the U-shaped part 74 is formed. Therefore, intake air can smoothly flow along the cooling air duct 50 toward the inlet 11a of the air cleaner 11 as indicated by the arrow 82 and hence the performance of the internal combustion engine 16 can be improved.

The embodiment described above has the following advantages.

(1) The cooling air passage 70 through which cooling air flows into the V-belt drive continuously variable transmission extends from the cooling air inlet 71 above the space beside the drive pulley 40 to the side opening 52 formed in the transmission case 37 beside the cooling fan. Therefore, the cooling air inlet 71 is at a long distance from muddy water and dust flung up by the rear wheel 10 and hence entrance of muddy water and dust into the cooling air inlet 71 can be suppressed. Further, the component members of the cooling air duct can be of small size. It is advantageous that muddy water that flows along the upper surface of the transmission case 37 holding the V-belt drive continuously variable transmission 18 does not flow into the transmission case 37

(2) The cooling air passage 70 is formed such that cooling air is taken in through the cooling air inlet 71 positioned above the space beside the transmission case 37, and flows along the U-shaped part 74 having the shape of the inverted letter U into the side opening 52 formed in the transmission case 37 beside the cooling fan. Thus muddy water and dust can be separated from cooling air by the U-shaped part 74. Therefore, if a filter is used, the life of the filter can be extended.

(3) The cooling air inlet 71 extends along and behind the edge 78 of the body cover. Therefore, entrance of foreign matters into the cooling air inlet 71 can be easily prevented.

(4) The cooling air duct 50 is disposed in a space covered with a laterally protruding side skirt 80 below the pillion footrest 79. Therefore, cooling air can flow smoothly as indicated by the arrow 81 through the space covered with the laterally protruding skirt 80 and hence cooling efficiency can be improved.

(5) The air cleaner 11 is disposed above the transmission case 37 such that the inlet 11a of the air cleaner 11 is positioned above the cooling air duct 50. Therefore, intake air can smoothly flow along the cooling air duct 50 toward the inlet 11a of the air cleaner 11 as indicated by the arrow 82 and hence the performance of the internal combustion engine 16 can be improved.

(6) The cooling air passage 70 is defined by the cooling air duct 50 covering the side opening 52 of the transmission case 37 beside the cooling fan of the transmission case 37. Therefore, intake noise generated by intake air flowing through the side opening 52 formed in the transmission case 37 opposite to the cooling fan can be absorbed and noise suppressing effect can be improved.

(7) The cooling air duct 50 is fastened to the transmission case 37 with the three fastening members 76 arranged around the side opening 52 beside the cooling fan. Therefore, the cooling air duct 50 can be firmly attached to the transmission case.

(8) At least part of the cooling air inlet 71 extends in an area 77 extending beside the drive pulley 40 of the V-belt drive continuously variable transmission 18 and having a diameter equal to that of the drive pulley 40. Therefore, the enlargement of the front part of the V-belt drive continuously variable transmission 18 can be avoided, the cooling air inlet 71 can be spaced a long distance apart from dust raised up by the rear wheel 10 and the entrance of dust into the V-belt drive continuously variable transmission 18 can be suppressed.

(9) Cooling air flows along the U-shaped cooling air passage 74 and the L-shaped cooling air passage 75 connected to the U-shaped cooling air passage 74 in the cooling air duct 50 to the side opening 52 beside the cooling fan. Therefore, the efficiency of separating muddy water and dust from cooling air is enhanced and, if a filter is used, cleaning load on the filter can be reduced.

(10) The O-ring 66 is placed in the joint of the cooling air duct 50 and the transmission case 37. Therefore, Noise leakage through gaps can be prevented and noise suppressing effect can be improved.

The invention claimed is:

1. A small vehicle having a cooling air intake structure for a V-belt drive continuously variable transmission disposed beside a rear wheel of the small vehicle, in which the transmission is included in a power unit swingably mounted on a frame of the vehicle, wherein said transmission has a transmission case with a cooling fan side opening and a cooling fan for inducing cooling air through the cooling fan side opening into the transmission case, wherein a cooling air duct is provided to form a cooling air passage therein, said cooling air passage having a cooling air inlet through which cooling air is taken in, said cooling air inlet being formed at a position beside the transmission case and above said cooling fan side opening, and said cooling air passage extends from the cooling air inlet to the cooling fan side opening in a manner surrounding the cooling fan side opening, wherein the cooling air passage is formed in the shape of an inverted letter U such that cooling air taken in through the cooling air inlet formed at the position above said cooling fan side opening flows upward first, and then flows downward along and inverted U-shaped path to the cooling fan side opening of the transmission case, wherein said cooling air inlet is formed along and behind an edge of a body cover of the small vehicle, and wherein said body cover is provided thereon with pillion foot rests positioned at front and upper positions relative to said cooling air passage, the cooling air passage being formed below the pillion foot rests and in a space covered with the body cover.

2. The small vehicle according to claim 1, wherein an air cleaner is disposed above the transmission case such that the air cleaner has an inlet positioned above the cooling air duct forming the cooling air passage.

3. The small vehicle according to claim 2, wherein the cooling air duct, covers the cooling fan side opening formed in the transmission case and is attached to a part of the transmission case beside a drive pulley coaxial with the cooling fan.

4. The small vehicle according to claim 3, wherein the cooling air duct is fastened to the transmission case with fastening members arranged on front and rear sides of the cooling fan side opening formed in the transmission case.

5. The small vehicle according to any one of claims 2, wherein a vibration isolating member is placed between the cooling air duct and the transmission case.

6. The small vehicle according to claim 1, wherein cooling air flows in the cooling air duct along the U-shaped passage, and then flows rearward along an L-shaped passage to the cooling fan side opening.

7. The small vehicle according to claim 1, wherein said body cover covers an outer side of said cooling air inlet.

8. The small vehicle according to claim 1, wherein said cooling fan side opening of the transmission case is located directly below the cooling air inlet, in a side view, and the cooling air passage is formed such that cooling air taken in is caused to flow upward, forward and then downward in the shape of an inverted letter U and thereafter to flow rearward in an L-shape to be led to the cooling fan side opening.

9. The small vehicle according to claim 1, wherein said cooling air duct is made of an inner duct member and an outer duct member, said cooling air passage is defined by a cooling air passage guide wall sealed by an O-ring between the inner and outer duct members, and another cooling air passage guide wall is provided in an area adjoining the cooling air inlet and between the inner and outer duct members, said other cooling air passage guide wall being formed with a gap forming a part for draining rain water.

* * * * *